United States Patent [19]
McCullouch, Jr. et al.

[11] Patent Number: 4,666,989
[45] Date of Patent: May 19, 1987

[54] POLYBUTYLENE MODIFIED MASTERBATCHES FOR IMPACT RESISTANT POLYPROPYLENE

[75] Inventors: J. Douglas McCullouch, Jr., Houston, Tex.; Louis C. Rhodes, Brookfield, Wis.

[73] Assignee: Shell Oil Company, Houston, Tex.

[21] Appl. No.: 799,551

[22] Filed: Nov. 19, 1985

Related U.S. Application Data

[60] Continuation of Ser. No. 559,523, Dec. 8, 1983, abandoned, which is a continuation-in-part of Ser. No. 469,022, Mar. 1, 1983, abandoned, which is a continuation of Ser. No. 310,703, Oct. 13, 1981, abandoned, which is a division of Ser. No. 171,272, Jul. 22, 1980, Pat. No. 4,311,807.

[51] Int. Cl.$^4$ .............. C08L 23/16; C08L 23/12; C08L 23/20
[52] U.S. Cl. .................................. 525/240; 525/211
[58] Field of Search ................... 525/240, 211

[56] References Cited

U.S. PATENT DOCUMENTS 3,250,825  5/1966  Martinorich ............... 525/240
3,835,201  9/1974  Fischer ..................... 525/240
4,078,020  3/1978  Rose et al. ............... 525/240

Primary Examiner—Carman J. Seccuro
Attorney, Agent, or Firm—Wendy K. B. Buskop

[57] ABSTRACT

An impact resistant polypropylene prepared with a masterbatch comprising an uncured elastomer, a butene-1 and an optional co-modifier such as high density polyethylene possesses improved weld line strength and other properties.

4 Claims, No Drawings

POLYBUTYLENE MODIFIED MASTERBATCHES FOR IMPACT RESISTANT POLYPROPYLENE

This is a continuation of application Ser. No. 559,523, filed Dec. 8, 1983, now abandoned, which is a continuation-in-part of application Ser. No. 469,022, filed Mar. 1, 1983, now abandoned, which is a continuation of application Ser. No. 310,703, filed Oct. 13, 1981, now abandoned, which is a division of application Ser. No. 171,272, filed July 22, 1980, now U.S. Pat. No. 4,311,807.

BACKGROUND OF THE INVENTION

This invention relates to polybutylene modified masterbatches used in the preparation of impact resistant polypropylene with enhanced properties. More particularly, a masterbatch comprising an elastomer, a butene-1 polymer and an optional co-modifier affords a polypropylene with improved properties, notably impact resistance, elongation properties and weld line strength.

High impact polypropylene (HIPP) having a flexural modulus of between 115,000 psi and 200,000 psi is conventionally produced by blending into polypropylene an impact blend consisting of a rubber such as an ethylene-propylene-diolefin elastomer (EPDM) and a co-modifier such as high density polyethylene (HDPE). The impact blend is typically "let down" into polypropylene by mixing pellets of the blend and polypropylene and extruding the mixture. While the addition of a rubber generally results in improved impact strength, the resulting HIPP may exhibit loss of weld line strength or ductility. It has now been discovered that substitution of a butene-1 polymer for all or a portion of the co-modifier used with the rubber in the impact blend, affords HIPP while avoiding these undesirable property changes in the finished product.

U.S. Pat. No. 4,078,020 discloses a *thermoplastic elastomer* composition which has a flexural modulus of between 4,000 and 109,000 psi comprising polypropylene, polybutylene and from 20 to 80% by weight of an elastomeric material such as an EPDM. The three components are blended to flux in a mixer; a masterbatch technique is not used. The composition has a higher rubber content and very low stiffness values, and does not exhibit the enhanced weld strength of HIPP prepared according to the present invention.

U.S. Pat. No. 3,455,871 discloses a masterbatch technique where butene-1 polymers are used as carriers to disperse additives in other polymers. The additives are described as non-olefinic materials such as pigments and lubricants, as opposed to the rubber or rubber/co-modifier mixed with the butene-1 polymer in the masterbatches herein.

SUMMARY OF THE INVENTION

This invention is directed to a masterbatch composition for the production of *impact resistant polypropylene* having a flexural modulus of between 115,000 psi and 200,000 psi which comprises:

(a) about 25 to 70% by weight of an uncured elastomer selected from the group consisting of ethylene-propylene copolymer, ethylene-propylene-diene terpolymer and mixtures thereof; and (b) about 30 to 75% by weight of an isotactic butene-1 polymer selected from the group consisting of butene-1 homopolymer, butene-1-ethylene copolymer and mixtures thereof.

Alternatively, this invention is directed to a masterbatch composition wherein the uncured elastomer is present in an amount of from about 20 to 70% by weight, the butene-1 polymer is present in an amount of from about 10 to 40% by weight, and which additionally comprises:

(c) about 10 to 40% by weight of a co-modifier selected from the group consisting of high density polyethylene, propylene-ethylene copolymer, polypropylene and mixtures thereof.

This invention is also directed to a method of making an impact resistant polypropylene having a flexural modulus of between 115,000 psi and 200,000 psi which comprises blending about 75 to 95% by weight of polypropylene with about 5 to 25% by weight of a masterbatch comprising either of the above-noted compositions. Further, the invention is directed to an impact resistant polypropylene having a flexural modulus of between 115,000 psi and 200,000 psi prepared by the described processes.

The masterbatch compositions and processes herein afford a polypropylene which may be prepared using very light compounding and exhibits improved properties over a wide range of proportions of the various components. These property enhancements do not normally result when the butene-1 polymer is co-compounded with a conventional rubber/co-modifier impact blend or when the butene-1 polymer is co-compounded with a rubber and/or co-modifier without use of a masterbatching technique. Incorporation of the butene-1 polymer in the masterbatch maximizes dispersion when compounded in the polypropylene matrix and offers convenience and economy in that the need for intensive mixing with the polypropylene is avoided and that only one material, the masterbatch itself, must be formulated in the polypropylene.

DESCRIPTION OF THE INVENTION

Component (a) of the masterbatch composition is an elastomer selected from the group consisting of ethylene-propylene copolymer, ethylene-propylene-diene terpolymer and mixtures thereof. The elastomer is not cured or crosslinked no free radial generating agent is used in its preparation or during blending. The ethylene-propylene copolymer, typified by saturated EPM, and the ethylene-propylene-diene terpolymer, typified by unsaturated EPDM, are commercially available and methods for their preparation are well known in the art as shown in, for example, U.S. Pat. No. 4,033,889. Suitable copolymers contain from about 30 to 80 weight percent, preferably 40 to 70 weight percent, of ethylene. Suitable terpolymers contain from about 30 to 80 weight percent, preferably about 40 to 70 weight percent, of ethylene, from about 18 to 70 weight percent, preferably about 30 to 60 weight percent, of propylene, and from about 0.2 to 10 weight percent, preferably about 1 to 3 weight percent of a non-conjugated diene or mixture thereof. The preferred dienes are 1,4-hexadiene, 5-ethyldiene-2-norbornene and dicyclopentadiene, with 1,4-hexadiene more preferred. The characteristics of the elastomer (rubber) used may affect the selection of a preferred masterbatch composition; suitable proportions of each component may be readily determined by routine experimentation. In general however, a partially crystalline rubber (e.g., 60 to 70% by weight ethylene content) is more suitable for use in masterbatches with higher rubber content; more amorphous rubbers (e.g., 40 to 55% by weight ethylene content) may cause such handling problems as excessive tackiness and/or a tendency towards "blocking".

Component (b) of the masterbatch composition is an isotactic butene-1 polymer selected from the group consisting of butene-1 homopolymer (polybutylene), butene-1-ethylene copolymer and mixtures thereof. The polymers used are suitably crystalline thermoplastic butene-1 polymers with molecular weights above 20,000. Suitable isotactic butene-1 polymers are commercially available and methods for their preparation are well known in the art as shown, for example, in U.S. Pat. No. 3,362,940. Suitable copolymers contain up to about 15 percent by weight, preferably up to 10 percent by weight of ethylene. In general, a butene-1-ethylene copolymer is suitably used as the butene-1 polymer component when increased weld strength of the finished impact resistant polypropylene is a primary consideration.

In the masterbatches of the invention which include a co-modifier (component [c]), the co-modifier is selected from the group consisting of high density polyethylene (HDPE), propylene-ethylene copolymer, polypropylene (PP) and mixtures thereof. In general, the use of HDPE as the co-modifier will result in finished polypropylenes showing higher impact strength values. The co-modifiers are commercially available and methods for their preparation are well known in the art. The propylene-ethylene copolymers are suitably no-elastomeric random or so-called "block" copolymers. The random propylene-ethylene copolymers suitably contain up to about 6, preferably up to 4 percent by weight of ethylene. The "block" propylene-ethylene copolymers are produced, for example, by sequential polymerization of propylene alone and, typically, a propylene-ethylene mixture, and may be an intimate in-situ blend with relatively few truly "blocked" molecules. The "block" copolymers suitably contain up to about 14, preferably up to 8 percent by weight of ethylene. The polypropylene is suitably crystalline isotactic polypropylene. The polypropylene or propylene-ethylene copolymer with which the masterbatch is blended may be conveniently used as a co-modifier in this instance.

Masterbatches which do not include a co-modifier component comprise about 25 to 70% by weight, preferably 50 to 67% by weight, of the uncured elastomer, and about 30 to 75% by weight, preferably 33 to 50% by weight, of the butene-1 polymer. Masterbatches which include a co-modifier component comprise about 20 to 70% by weight, preferably 33 to 67% by weight, of the uncured elastomer, about 10 to 40% by weight, preferably 15 to 33% by weight, of the butene-1 polymer, and about 10 to 40% by weight, preferably 15 to 33% by weight, of the co-modifier. In masterbatches including a co-modifier component, the amounts of butene-1 polymer and co-modifier used need not be equivalent. The masterbatch compositions are typically formulated by blending the components in a Banbury mixer or other intensive mixer.

This invention is also directed to a method of making an impact resistant polypropylene having a flexural modulus of between 115,000 psi and 200,000 psi, which comprises blending about 75 to 95% by weight, preferably 77 to 90% by weight, of polypropylene, with about 5 to 25% by weight, preferably 10 to 23% by weight, of a masterbatch composition, with or without a co-modifier, as defined herein. This invention is further directed to impact resistant polypropylenes prepared by the methods defined herein. Crystalline isotactic polypropylene is the preferred polypropylene although the non-elastomeric random or so-called "block" propylene-ethylene copolymers (described previously as suitable co-modifiers) may also be used. The polypropylenes are commercially available and methods for their preparation are well known to those skilled in the art. The impact resistant polypropylene of the invention is typically formulated by mixing, e.g., tumbling, pellets of the polypropylene and the masterbatch and extruding the mixture. The masterbatching technique according to the invention affords a good, uniform dispersion of the rubber (elastomer) component throughout the polypropylene matrix. Further, the use of very light compounding in a less intensive mixer, e.g., a single screw extruder or screw-type molding machine, is made possible; this, in turn, allows for the convenience and economy of higher throughput levels. If desired, various conventional fillers, stabilizers, processing agents and/or pigments may be included in the polymer.

Impact resistant polypropylene prepared according to the invention exhibits a wide variety of improved properties over polypropylenes prepared with masterbatches not containing a butene-1 polymer or polypropylenes prepared by co-compounding all components without use of the masterbatch technique. The polypropylene of the invention may demonstrate, for example, improvement in impact resistance, impact shear sensitivity, weld line strength, elongation properties (ductility), spiral flow and/or toughness. The finished polypropylene may be used in various fabrication equipment, including molding, extrusion, forming and blow molding equipment, for the manufacture of molded articles, pipe, film and other items.

The invention is illustrated further in the following examples, which are not to be construed as limiting its scope. In the examples, the components are denoted as follows:

PB-A—butene-1-ethylene copolymer (8%w ethylene) with melt index of 0.2

PB-B—butene-±homopolymer with melt index of 1.8

PB-C—butene-1-ethylene copolymer (8%w ethylene) with melt index of 1.8

PP-A—isotactic 5 melt flow propylene homopolymer

PP-B—isotactic 12 melt flow propylene homopolymer.

The melt index and melt flow, as used herein, were measured by ASTM D1238 Conditions E and L, respectively. The rubber used was an EPDM terpolymer consisting essentially of 50 weight % ethylene, 48 weight % propylene and 2 weight % 1,4-hexadiene. The HDPE used had a melt index of 2 and a specific gravity of 0.96.

EXAMPLE I

In this series of experiments, impact resistant polypropylene was prepared by compounding polypropylene with 23%w of a masterbatch containing a butene-1-ethylene copolymer in a Prodex single screw extruder. The masterbatches had been separately prepared by Banbury compounding of an EPDM terpolymer rubber, the butene-1-ethylene copolymer and a co-modifier consisting of HDPE or an additional portion of the same polypropylene. An experiment using a conventional 50:50 EPDM rubber/HDPE masterbatch was run as a control (Composition A). The finished impact resistant polypropylenes were evaluated and the results are shown below in Table I. The falling weight impact strength (FWIS) test was conducted using a 1.27 cm top radius, 66 cm drop and variable weight (ASTM D3029 modified). The weld strength (ASTM D638 modified) was determined using double-gated specimens at 12.7 cm/minutes. The spiral flow was determined with an Archimedes flat spiral with a 1.27 by 0.25 cm cross-sectional area. The results from the evaluation of the finished impact resistant polypropylenes are shown below in Table I.

TABLE I

Evaluation of Impact Resistant Polypropylene Prepared with Masterbatches Containing Butene-1 Polymers

| Masterbatch Composition % | A | B | C |
|---|---|---|---|
| EPDM Rubber | 11.5 | 11.5 | 11.5 |
| HDPE | 11.5 | 6.5 | — |
| PP-A | — | — | 6.5 |
| PB-A | — | 5 | 5 |
| Basestock: PP-A | 77 | 77 | 77 |
| Properties | | | |
| FWIS (−20° C.), | | | |
| Minimum Shear, Joules | 20 | 21 | 18 |
| Maximum Shear, Joules | 15 | 21 | 16 |
| Weld Strength, % | 3 | 5 | 6 |
| Spiral Flow (230° C., 6895 kPa), cm. | 47.5 | 48.7 | 51.3 |
| Tensile Yield at 5 mm/min, MPa (ASTM D638) | 21 | 19 | 19 |
| Yield Elongation at 5 mm/min, % (ASTM D638) | 10 | 11 | 9 |
| Flexural Modulus (50 mm span) at | | | |
| 1.3 mm/min, MPa (ASTM D790) | 950 | 800 | 825 |
| psi | 138,000 | 116,000 | 120,000 |
| Izod Impact Strength (ASTM D256) | | | |
| at 23° C., J/m | 220 | 560 | 60 |
| at −18° C., Jm | 19 | 15 | 15 |
| Heat Deflection Temperature (455 kPa), °C. (ASTM D648) | 90 | 78 | 89 |

A comparison of Compositions B and C, which contain a butene-1 polymer, with the control Composition A, shows that impact resistant polypropylene prepared using a butene-1 polymer has substantially improved weld strength, good practical impact (FWIS), minimal impact shear sensitivity and somewhat improved flow. The stiffness (flexural modulus), tensile yield and heat distortion were negatively affected by incorporation of the butene-1 polymer.

EXAMPLE II

In this series of experiments, impact resistance polypropylene was prepared by compounding a polypropylene (PP-B) with 23% w of various impact masterbatches in a Sterling 1.25 inch extruder. The masterbatches had been separately prepared by Banbury compounding of an EPDM terpolymer rubber, a butene-1 polymer and optionally an HDPE co-modifier. An experiment using the conventional 50:50 EPDM rubber/HDPE masterbatch of Example I was run as a control (Composition D). The mechanical properties of the finished impact resistant polypropylenes are shown below in Table II. Testing was conducted according to the methods described in Example I and Table I.

All four of the products prepared with masterbatches containing butene-1 polymers showed improved weld strength over control Composition D, although declines in the 1% secant modulus were also observed. The two-component masterbatch products, Compositions E and H, showed greater weld strength enhancements than the three-component masterbatch products, Compositions F and G. The Battenfeld Izod test data, for double-gated specimens, a combined measure of weld and impact strength, showed better results at both temperatures for all the butene-1 polymer containing products than for the control Composition D. On the other hand, the New Britain standard Izod test data for single-gated specimens showed comparable results for the control and the products containing butene-1 polymers. Compositions E through H generally gave improved ultimate elongation values and greatly improved Gardner impact values; these properties are direct measures of toughness. When the properties of each blend were numerically ranked relative to the others, Composition G was found to have the best overall performance, although this does not necessarily mean it would be the composition of choice for all specific applications.

EXAMPLE III (not according to the invention)

In this series of experiments, pellets of a butene-1-ethylene copolymer, an optional HDPE co-modifier and polypropylene and a ground EPDM terpolymer were mixed and co-compounded in a Prodex single screw extruder, without use of a masterbatch technique. Testing was conducted according to the methods described in Example I and Table I. Spiral flows and both FWIS impact plaques were prepared on a Van Dorn screw-type injection molding press. The double gated tensile bar for weld strength was prepared on a battenfeld molding press. In preparing the blends, the ground EPDM terpolymer was dusted with 3%w of a 10 melt flow polypropylene powder to prevent blocking. The compositions and properties of the resultant impact resistant polypropylene are shown below in Table III. A comparison of Composition J with Composition B in Table I demonstrates that impact resistant polypropylene prepared with a masterbatch technique exhibits improved weld strength and flow.

TABLE II

Evaluation of Impact Resistant Polypropylene with Masterbatches Containing Butene-1 Polymers

| Comp. | Impact Masterbatch Composition, % w | | | | Battenfeld Injection Molder[a] | | | | | | | |
| | EPDM Rubber | HDPE | PB-B | PB-C | Weld Strength %[c] | Unnotched Izod −18° C. | J/m 23° C. | 1% Secant Modulus, MPa | Yield Tensile MPa | Yield Elong. % | Ultimate Elong. % | Gardner Impact[d] −30° C.; J | Unnotched Izod, −18° C.; kJ/m |
|---|---|---|---|---|---|---|---|---|---|---|---|---|---|
| D | 50 | 50 | — | — | 2.0 | 101 | 96 | 1160 | 26.4 | 9 | 16 | 6.4 | 1.2 |
| E | 50 | — | — | 50 | 4.5 | 112 | 123 | 896 | 24.1 | 12 | 185 | 6.3 | 1.0 |
| F | 50 | 25 | — | 25 | 3.3 | 123 | 133 | 965 | 24.8 | 13 | 170[e] | 7.3 | 1.3 |
| G | 50 | 25 | 25 | — | 3.0 | 123 | 128 | 1080 | 26.5 | 10 | 173[f] | 8.0 | 1.2 |

TABLE II-continued

Evaluation of Impact Resistant Polypropylene with Masterbatches Containing Butene-1 Polymers Battenfeld Injection Molder[a]

| Comp. | Impact Masterbatch Composition, % w | | | | Weld Strength %[c] | Un-notched Izod −18° C. | J/m 23° C. | 1% Secant Modulus, MPa | Yield Tensile MPa | Yield Elong. % | Ulti-mate Elong. % | Gardner Impact[d] −30° C.; J | Unnotched Izod, −18° C.; kJ/m |
|---|---|---|---|---|---|---|---|---|---|---|---|---|---|
| | EPDM Rubber | HDPE | PB-B | PB-C | | | | | | | | | |
| H | 50 | — | 50 | — | 4.0 | 123 | 155 | 1020 | 26.1 | 10 | 134 | 13.0 | 0.80 |

[a]Molding temperature set at about 210° C. or above; double-gated tensile specimen.
[b]Molding temperature set at about 204° C. or above.
[c]Rate of strain 127 mm/min.
[d]Disk: 51 × 32 mm (test with ring in).
[e]95% confidence limits ± 103%.
[f]95% confidence limits ± 78%.

TABLE III

Evaluation of Co-compounded Impact Resistant Polypropylene Prepared Without Masterbatching

| Composition, % | Co-compounded | | |
|---|---|---|---|
| | J | K | L |
| EPDM Rubber | 11.5 | 11.5 | 11.5 |
| HDPE | 6.5 | — | 11.5 |
| PB-A | 5 | 11.5 | 5 |
| PP-A | 77 | 77 | 72 |
| Compounding Equipment | Prodex | Prodex | Prodex |
| Properties | | | |
| FWIS at −20° C., Joules | | | |
| Minimum shear | 26 | 28 | 32 |
| Maximum shear | 26 | 31 | 34 |
| Weld Strength, % | 3.5 | 4 | 3 |
| Spiral flow, cm. (230° C., 6895 kPa) | 46.2 | 46.9 | 45.1 |

What is claimed is:

1. A masterbatch composition for the production of impact resistant polypropylene which consists of:
   (a) from about 25 percent by weight to about 60 percent by weight of an ethylene-propylene-diene terpolymer, where the ethylene content of said ethylene-propylene-diene terpolymer is from about 60% by weight to about 80% by weight to impart ethylenic crystallinity to said ethylene-propylene terpolymer;
   (b) from about 40 percent by weight to about 75 percent by weight of a butene-1-ethylene-copolymer, where the ethylene content of said butene-1 ethylene copolymer is in a positive amount up to about 15 percent by weight and wherein said butene-1 -ethylene copolymer has a density of less than 0.890; and
   (c) where said impact resistant polypropylene has a flexual modulus of at least 115,000 psi but no greater than 200,000 psi.

2. The masterbatch composition of claim 1, which consists of:
   (a) about 50 percent by weight of said ethylene-propylene-diene terpolymer, wherein the ethylene content of said ethylene-propylene-diene terpolymer is from about 60 percent by weight to about 80 percent by weight to impart ethylenic crystallinity to said ethylene-propylene-diene terpolymer;
   (b) about 50 percent by weight of said bultene-1-ethylene copolymer wherein the ethylene content of said butene-1 -ethylene copolymer is in a positive amount up to about 15 percent by weight and the butene-1 ethylene copolymer has a density of less than 0.890; and
   (c) where said impact resistant polypropylene has a flexural modulus of at least 115,000 psi but no greater than 200,000 psi.

3. An impact resistant, weld line containing, injection molded article prepared from a polypropylene composition which is the product of blending from about 75 percent by weight to about 95 percent by weight of polypropylene with from about 5 percent by weight to about 25 percent by weight of a masterbatch composition consisting of:
   (a) from about 25 percent by weight to about 60 percent by weight of an ethylene-propylene-diene terpolymer wherein the ethylene content of said ethylene-propylene-diene terpolymer is from about 60 percent by weight to about 80 percent by weight to impart ethylenic crystallinity to said ethylene-propylene-diene terpolymer;
   (b) from about 40 percent by weight to about 75 percent by weight of a butene-1-ethylene copolymer, wherein said ethylene content of said butene-1 ethylene copolymer is in a positive amount up to about 15 percent by weight and said butene-1 ethylene copolymer has a density of less than 0.890, and
   (c) where said impact resistant polypropylene has a flexural modulus of at least 115,000 psi but no greater than 200,000 psi.

4. An impact resistant, weld line containing, injection molded article prepared from a polypropylene composition according to claim 2, in which the propylene composition is the product of blending from about 77 percent by weight to about 90 percent by weight of said polypropylene with from about 10 percent by weight to about 23 percent by weight of said masterbatch composition.

* * * * *